(12) United States Patent  
Sinn et al.

(10) Patent No.: US 6,447,234 B2
(45) Date of Patent: *Sep. 10, 2002

(54) LIVESTOCK LOADING/UNLOADING SYSTEM

(75) Inventors: Steven C. Sinn, Tremont, IL (US); John D. Wilham, East Peoria, IL (US); James Pyle, Harrodsburg, KY (US); Richard Bloome, Carlinville, IL (US)

(73) Assignee: Turkey Scope, LLC, Tremont, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,427

(22) Filed: Mar. 26, 1999

Related U.S. Application Data (63) Continuation-in-part of application No. 08/804,359, filed on Feb. 21, 1997, now Pat. No. 5,902,089.

(51) Int. Cl.[7] .............................................. B65G 67/08
(52) U.S. Cl. ...................... 414/398; 198/313; 198/812; 119/846; 414/346
(58) Field of Search ................................ 414/340, 346, 414/350, 351, 353, 398, 503, 504, 505, 523, 528; 198/313, 314, 315, 316.1, 594, 632, 812; 119/845, 846

(56) References Cited

U.S. PATENT DOCUMENTS

| | | |
|---|---|---|
| 2,834,487 A | 5/1958 | Gaddis |
| 3,066,817 A | 12/1962 | Bradshaw et al. |
| 3,253,577 A | 5/1966 | Lund |
| 3,272,182 A | 9/1966 | Lund |
| 3,292,965 A | 12/1966 | Powers |
| 3,420,211 A | 1/1969 | Hartvickson |
| 3,452,718 A | 7/1969 | Wight |
| 3,476,089 A | 11/1969 | Jerome |
| 3,524,558 A | 8/1970 | Mastracci et al. |
| 3,548,895 A | 12/1970 | Gentry |
| 3,702,600 A | * 11/1972 | Bright et al. ............... 119/846 |
| 3,706,300 A | 12/1972 | Wessinger |
| 3,722,477 A | 3/1973 | Weldy et al. |
| 3,825,107 A | 7/1974 | Cary et al. |
| 3,826,353 A | 7/1974 | Greasley |
| 3,916,835 A | 11/1975 | Reynolds |
| 3,942,476 A | 3/1976 | Napier |
| 3,945,484 A | 3/1976 | Oury |
| 4,037,565 A | * 7/1977 | Ledwell, Jr. ................ 119/846 |
| 4,151,906 A | 5/1979 | Pfeiffer et al. |
| 4,210,237 A | 7/1980 | Gram |
| 4,279,555 A | * 7/1981 | Rydell ..................... 198/594 X |
| 4,303,258 A | 12/1981 | Davis |
| 4,365,591 A | 12/1982 | Wills et al. |

(List continued on next page.)

FOREIGN PATENT DOCUMENTS

SU        1020-280 A        9/1981

*Primary Examiner*—James W. Keenan
(74) *Attorney, Agent, or Firm*—Cook, Alex, McFarron, Manzo Cummings & Mehler (57) ABSTRACT

A livestock loading/unloading system for transporting livestock from/to a confinement area to/from a transport vehicle to allow transport from farm-to-farm, from farm-to-processing plant or from processing plant-to-farm. The livestock loading/unloading system includes a mobile conveying apparatus whereby the livestock ride a conveyor from/to the confinement area to/from a transport vehicle. Such a transport vehicle may be specially adapted for use in conjunction with the conveying apparatus, or may be of the conventional livestock transporting type. The conveying apparatus includes a telescoping end that extends into and retracts from the coops of the transport vehicle. A system of hydraulics controls the speed of the conveyor, aids in the transverse leveling of the machine, adjusts both the angle and tier of loading, and levels and controls the telescoping end of the conveyor.

19 Claims, 10 Drawing Sheets

U.S. PATENT DOCUMENTS

| | | |
|---|---|---|
| 4,380,969 A | 4/1983 | Thomas |
| 4,499,856 A | 2/1985 | Hecht et al. |
| 4,600,351 A | 7/1986 | Nelson |
| 4,780,041 A | 10/1988 | Ashby, Jr. |
| 4,813,526 A * | 3/1989 | Belanger ................ 198/314 X |
| 4,878,799 A | 11/1989 | Seto et al. |
| 4,923,359 A | 5/1990 | Petri et al. |
| 5,060,596 A | 10/1991 | Esbroeck |
| 5,067,867 A | 11/1991 | Ruder et al. |
| 5,078,259 A | 1/1992 | Honsberg |
| 5,195,687 A | 3/1993 | Derichs et al. |
| 5,256,021 A | 10/1993 | Wolf et al. |
| 5,288,201 A | 2/1994 | Pippin |
| 5,307,917 A | 5/1994 | Hall |
| 5,322,154 A | 6/1994 | Lenherr |
| 5,351,809 A | 10/1994 | Gilmore et al. |
| 5,360,097 A | 11/1994 | Hibbs |
| 5,470,194 A | 11/1995 | Zegers |
| 5,637,183 A | 6/1997 | Börner |
| 5,642,803 A | 7/1997 | Tanaka |
| 5,660,147 A | 8/1997 | Wills et al. |
| 5,685,416 A | 11/1997 | Bonnett |
| 5,743,217 A * | 4/1998 | Jerome ....................... 119/846 |
| 5,902,089 A * | 5/1999 | Sinn et al. ................... 414/398 |
| 5,915,338 A * | 6/1999 | Fitzsimmons et al. .. 414/398 X |
| 6,109,215 A * | 8/2000 | Jerome ....................... 119/845 |

\* cited by examiner

LIVESTOCK LOADING/UNLOADING SYSTEM

CROSS-REFERENCE TO RELATED APPLICATION

This application is a continuation-in-part of Ser. No. 08/804,359, filed Feb. 21, 1997, now U.S. Pat. No. 5,902,089.

BACKGROUND OF THE INVENTION

The present invention relates generally to a system for handling livestock and more particularly to a system, means, device or apparatus to effect the efficient handling of livestock in the loading/unloading of the same at a farm site or processing plant and transport therefrom/thereto.

It will be understood and appreciated that the foregoing description of the present invention may be explained as it pertains to the handling of poultry but in no way shall be indicative of the limiting of "livestock" thereto.

Commercial poultry, such as turkeys, chickens, guineas, peafowl, ostriches, ducks, geese, swans and pigeons, have been a main staple of protein throughout history. For centuries poultry was raised and processed on the farm to be locally delivered to those who desired fresh poultry. But as the population migrated to towns and cities, the demand for processed poultry increased dramatically. Fresh processed poultry now had to be transported to the markets located in these cities.

The poultry was customarily gathered manually at poultry houses, boxed or crated with numerous birds per crate, manually loaded aboard an open truck or van, and transported. The problems created by such a procedure are both numerous and significant. The manual handling of the poultry not only creates a materially high cost involved in raising the poultry and preparing them for market, but it also creates certain physical dangers to both the poultry as well as the workmen.

During hand catching and subsequent handling of poultry, is some birds are bruised, injured, or even killed due to violent reaction of the birds or unintentional rough handling by the workmen. Additionally, fowl inevitably beat their wings in an effort to escape upon capture, frequently resulting in a bird striking the handler with sufficient force to cause physical injury.

As technology was developed for the processing and safe storage of poultry, small processing plants developed and the manual loading of crates or coops began to improve. One of the first significant improvements, particularly in the turkey industry, was to create coops or crates which were permanently attached to a trailer or truck bed. These trucks contain large numbers of individual coops attached on the truck body. The coops having doors opening outward and being arranged in horizontal rows and vertical tiers. These coops or compartments typically having a permanent middle portion, and as such require loading from both sides of the truck. Not only is this time consuming, but loading from both sides also requires the trailer to turn around with all of its weight on one side thus causing an unsafe situation to driver, machinery and trailer.

The usual method of loading the poultry is to catch the animals individually and then lift and carry them to the coops while using makeshift platforms to reach the higher coops or to hand the birds to other workmen who are clinging to or standing on supports attached to the sides of the truck. This causes a high incident of injuries to workers and animals alike, not to mention the considerable time requirements needed to accomplish the loading/unloading of a complete truck.

In light of the preceding problems, there has been an effort in the art to develop a method of loading poultry for transport with a minimal amount of manual labor. For example, U.S. Pat. No. 3,706,300, issued Dec. 19, 1972 describes a system for handling poultry and transferring the same from poultry house to processing plant or purchases. This is accomplished by a process in which suction is applied to the poultry in the house to urge the poultry into a conveying conduit where air pressure is subsequently applied for forcing the poultry along the conduit and into a suitable bin. Air pressure is again used to urge the poultry out of the bin and into the processing plant. Although this system utilizing air pressure does solve some of the problems associated with that of manual labor, the air pressure tends to force the poultry through the loading system, and does not allow for a smooth and even flow. This constant forcing inevitably damages the poultry in some way, including broken legs and/or wings, which results in an adverse affect on their grading when dressed, and consequently a loss of revenue to the producer.

Another attempt to solve the problems associated with loading poultry on a transport vehicle was disclosed in U.S. Pat. No. 3,916,835, issued Nov. 4, 1975. This patent describes a complete conveying system that utilizes conveyors on the poultry transport vehicle that may be operated in conjunction with other if external conveyors to effect embarkation and debarkation of the transport. If external conveyors are desired, this disclosure provides for an elevator and coupling assembly for coupling an external conveyor unit at selective heights to the various tiers of the poultry conveying transport apparatus.

Although manpower and its associated high costs are reduced with the use of such a conveying system, problems still remain. This patent discloses the combination of a main conveying apparatus, external conveyors and an elevator and coupling assembly. This assembly is integral to the main apparatus, and the changing of tier positions during loading and unloading cannot be accomplished solely by the external conveyors. Additionally, manual labor is still needed to load and unload the bottom of the external conveyors. Still another problem with this external conveyor is the steep angle at which the poultry are handled, causing the poultry to become uneasy, and "Roll Back" to occur.

Today, the poultry business is a multi-billion dollar industry. Large companies dominate the production, slaughter and marketing of products. Since poultry companies are now fewer in number, they therefore demand large quantities of animals daily for processing. In fact, enormous numbers of poultry are transferred daily from production facilities to the slaughter plant or to different production facilities en route to the slaughter plant.

In view of the aforementioned needs and the shortcomings of the prior art, it is therefore an object of the present invention to provide a system that overcomes the deficiencies of the current practices whereby an apparatus and system is provided for loading/unloading livestock for transport with a minimum amount of labor and with maximum efficiency at a minimum cost.

It is an object of the present invention to provide a livestock loading/unloading system which maximizes efficiency by increasing the number of animals transported per shift and decreasing any damage to the animals and decreasing any contamination during the processing of the animals.

It is an object of the present invention to provide a livestock loading/unloading system which minimizes labor costs by reducing the number of employees as well as the turnover rate of employees.

It is another object of the present invention to provide a livestock loading/unloading system whereby the manual and perhaps rough handling of the livestock is eliminated thereby improving overall animal quality by reducing animal stress and minimizing any damages sustained to the livestock.

Still another object of the present invention is to provide a mobile livestock loading/unloading apparatus that is compatible with the current industry loaders and processing plants and can be shared among confinement areas, farms, or even towns due to its adaptability to all trailers.

Still another object of the present invention is to provide a self-cleaning and disinfecting livestock loading/unloading apparatus.

It is yet another object of the present invention to provide a user friendly livestock loading/unloading apparatus that may be operated effectively by a single person.

These and other objects, features and advantages of the present invention will be clearly understood through a consideration of the following detailed description.

SUMMARY OF THE INVENTION

According to the present invention, there is provided a livestock loading/unloading apparatus having a base, mainframe and telescopic section defining a transport system. The base, mainframe and telescopic section are pivotably attached to one another while the mainframe and telescopic sections are extendable and retractable. The apparatus has a control system for its overall leveling and pivotal height adjustments, as well as the extending/retracting capabilities of its conveyance.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 9b is a top plan view of the undercarriage of FIG. 9a.

FIG. 10a is a side view of the livestock loading/unloading apparatus constructed in accordance with the alternate embodiment of the present invention.

FIG. 10b is a top plan view of the apparatus of FIG. 10a.

FIG. 10c is a side view of the apparatus of FIG. 10a in the transport position.

FIG. 12 is a side view of the conveyor configuration of FIG. 10.

FIG. 13a is a side view of the transport vehicle constructed in accordance with the alternate embodiment of the present invention.

FIG. 13b is a rear view of the transport vehicle of FIG. 13a.

FIG. 14 is an enlarged side view of one of a module of the transport vehicle of FIG. 13a.

FIG. 15 is an enlarged rear view of the module of FIG. 14.

DESCRIPTION OF THE PREFERRED EMBODIMENT

Figure 1:
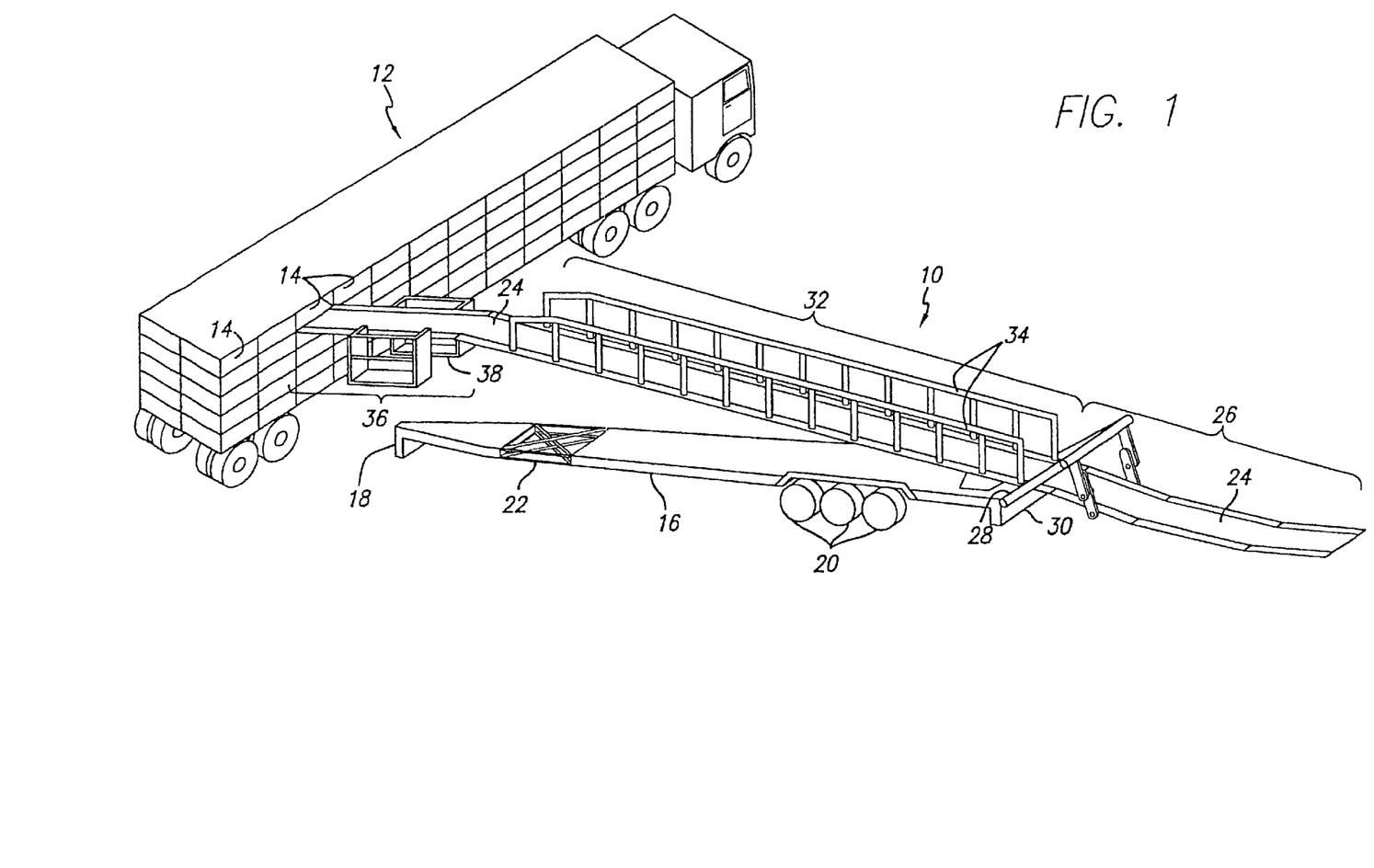
FIG. 1 is a perspective view of a transport vehicle along side the livestock loading/unloading apparatus constructed in accordance with an embodiment of the present invention.

FIG. 1 illustrates a poultry loading/unloading apparatus 10 constructed in accordance with the principles of one embodiment of the present invention. The apparatus 10 is shown in its operable state along side a transport vehicle 12 having numerous rows of poultry coops 14. The apparatus 10 may be integral with a trailer 16 which includes a hitch 18 with size adaptation, and wheels 20. Although the apparatus 10 is more efficient when used with trailer 16, the apparatus 10 is able to of address all existing fleet of coop trailers. The trailer 16 further includes an elbow portion 22 (better shown in FIG. 2) to aid the apparatus 10 into its transport position.

In this embodiment, the apparatus 10 utilizes a single endless conveyor belt 24 along its entire track. Presently the apparatus 10 is composed of three sections. The first section is the preloader 26 section at which the poultry begin their trek. The preloader 26 operates near the ground as depicted in FIG. 1, but its gooseneck portion 28 and support members 30 allow it to pivot and lay upon the mainframe 32 of the apparatus 10 during transport.

The mainframe 32 is positioned above the trailer 16 and may include protective sides 34 or even a cover. At the end of the mainframe 32 opposite the preloader 26 is the telescoping 36 section of the apparatus 10. FIG. 1 shows an operator platform 38 on either side of the telescope end 36 of the apparatus 10. An operator positioned upon this platform 38 has the capability to control all functions of the entire apparatus 10.

Figure 2:
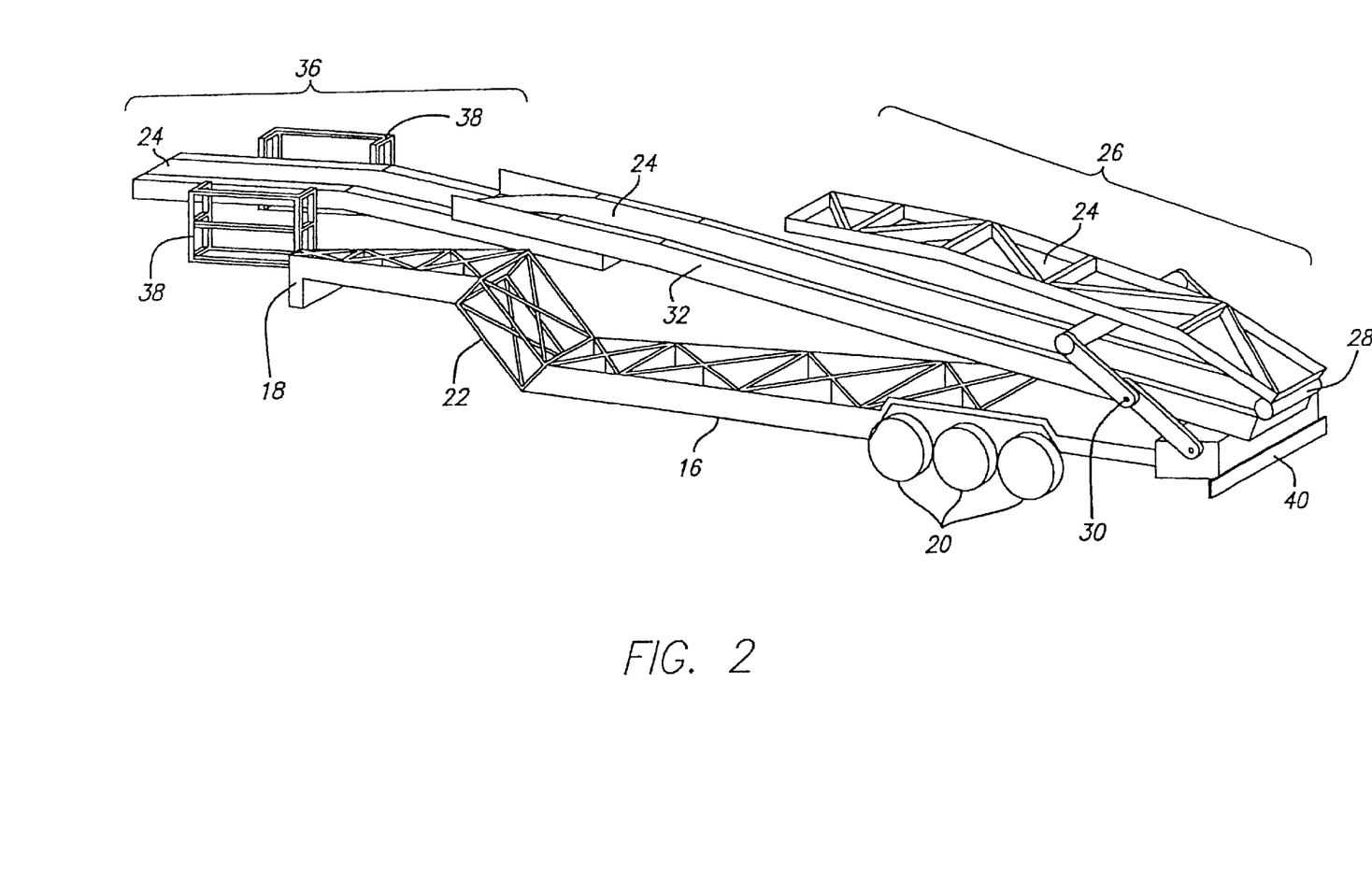
FIG. 2 is a perspective view of the livestock loading/unloading apparatus of FIG. 1 in the transport position.

One of the advantages of the poultry loading apparatus 10 of the present invention is its mobile capability. FIG. 2 illustrates the ease with which such a design is compacted to allow the apparatus 10 to be legally towed. This is accomplished by either manually or hydraulically folding the preloader 26 at its neck 28 upon the mainframe 32, and also telescoping inwards the telescoping end 36 of the apparatus 10. Upon such folding over of the preloader 26, the end 40 of the trailer 16 can be seen and may include those requisite items that allow for legal transport. The elbow 22 of the trailer is now bent to allow connection of the hitch 18 with a truck or cab.

Figures 3, 4:
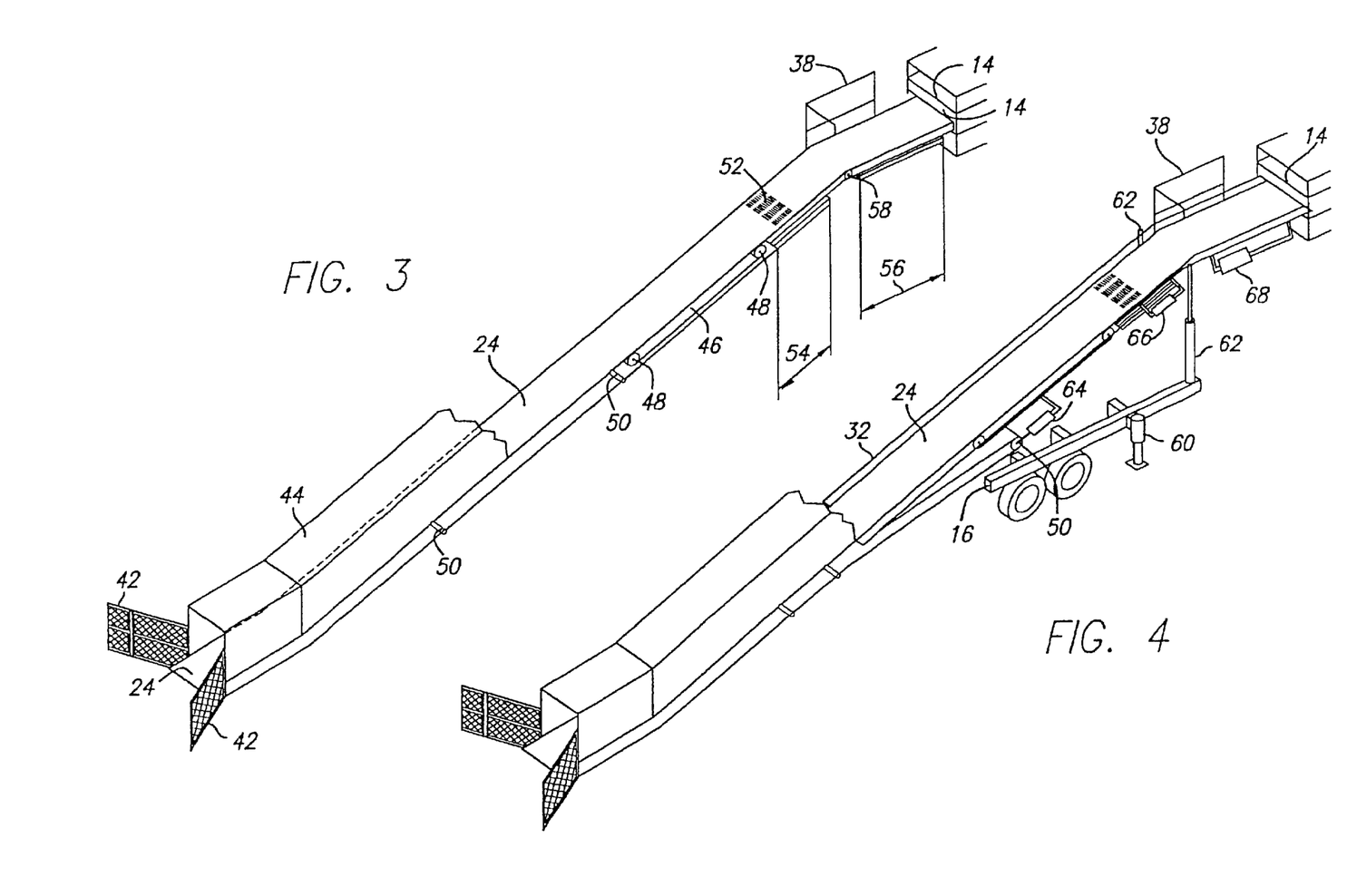
FIG. 3 is a reverse perspective view of FIG. 1 depicting the conveying system of the apparatus.
FIG. 4 is a reverse perspective view of FIG. 1 further depicting the hydraulic system of the apparatus.

FIG. 3 is illustrative of the conveying system of this embodiment. The poultry first need to be coaxed onto the conveyor belt 24 at the front end of the preloader 26. This is accomplished through the placement of temporary corral fences 42 about the area from which the poultry will be loaded. The only exit for the poultry will be through the preloader 26 and on to the conveyor belt 24. This can be done by any unskilled hand through any conventional coaxing method. The preloader 26 is shown in FIG. 3 with a removable cover 44 that may extend all the way to the designated coop 14. The tunnel resulting beneath the cover may have a forced air draft of variable volume to keep the poultry cool in hot weather. The tunnel also provides a dark environment which results in a calming effect on the poultry.

The main conveyor belt 24 is powered by a hydraulic motor-driven booster belt 46 in this embodiment. The booster belt 46 transfers its energy to the main belt 24 via surface contact. Booster belt rollers 48 are located within the mainframe 32. Similarly, numerous main belt rollers 50 are utilized throughout the entire track of the main belts 24 travel. The booster belt 46 is preferred to power the main conveyor belt 24 because a low tension is needed due to wear on the belt 24 as it is constantly run over the small rollers 50. In this embodiment, the main belt carrying surface is equipped with miniature cleats 52 to aid in traction.

In order to address different height and length tiers during loading, the poultry loading/unloading apparatus 10 is adjustable both at its mainframe 32 and at its telescoping end 36. To maintain the main belt 24 at a constant tension and a constant length during these adjustments, the poultry loading apparatus 10 utilizes a pair of belt pulleys that "make up" the space that results from either an increased belt length during adjustment to a higher tier coop or a decreased belt length when lowering. This embodiment includes two such belt pulleys. One set is the mainframe belt pulleys 54 which are mounted on a single frame allowing the operator to make up the space that results when each higher tier is addressed on the coop transport vehicle. The other set is the telescoping belt pulleys 56 which are mounted on a single frame which telescopes into the poultry coop. The telescoping belt pulleys 56 also make up any difference in main belt tension or length when the telescoping portion needs to pivot upon the telescoping pivot point 58.

FIG. 4 is illustrative of the methods of controlling the poultry loading apparatus 10. This embodiment controls all of its functions via hydraulic air flow and consequently the speeds of all functions can be varied. When the apparatus is initially positioned between the transport vehicle and the confinement area, a pair of twin hydraulic cylinders or outriggers 60, which are attached to the trailer 16, are adjusted to level the apparatus transversely. Another pair of hydraulic cylinders 62 adjust the operating angle of the apparatus. From the parked angular position of 4°, the operating angle can be adjusted to a preferred angle of 5° through 18°, although angles greater than 18° may be achieved.

Figure 5:
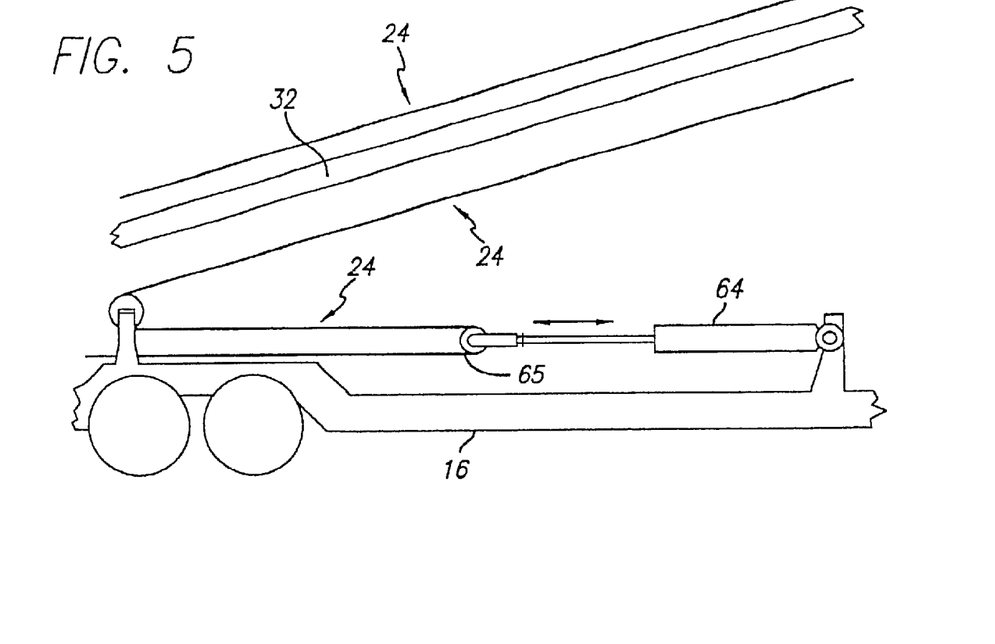
FIG. 5 is a profile view of FIG. 4 focusing on the main tension control hydraulic cylinder.

FIG. 5 depicts a more detailed illustration of the function of the hydraulic cylinder 64 and pulley 65 as they maintain a preset tension on the main conveyor belt 24, thereby automatically adjusting the belt length as an auxiliary function. This cylinder 64 along with pulley 65 are also used to release tension and acquire slack in the main belt 24 when preparing to pull out or pull in the three piece preloader 26 when setting up or preparing to transport to another location.

Figure 6:
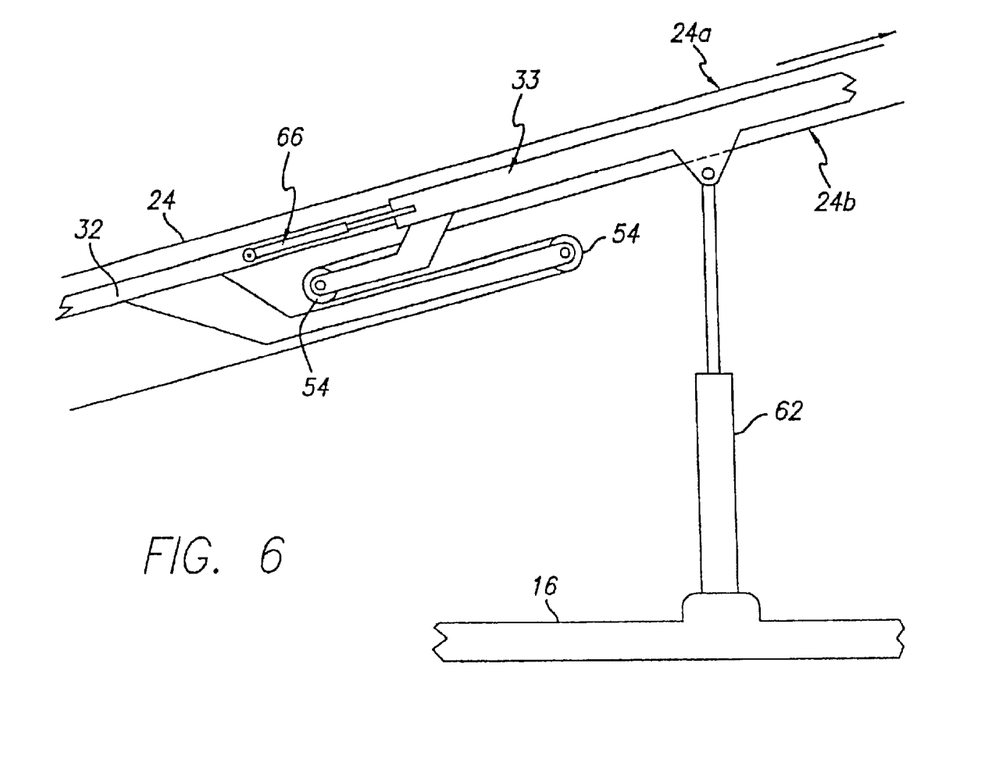
FIG. 6 is a profile view of FIG. 4 focusing on the mainframe tension control hydraulic cylinders.

The two pair of belt pulleys 54,56, discussed previously, are also controlled by hydraulic cylinders. As shown in FIG. 6, a pair of hydraulic cylinders 66 are positioned on either side of the conveyor belt on the top portion of the mainframe 32 relative the mainframe belt pulleys 54. These belt pulleys 54 automatically move toward each other shortening the return belt 24b by an amount equal to the lengthening of the carrying belt 24a when the operator extends the hydraulic cylinder 66 to telescope the fly frame 33 inward. The telescoping function of these elements enable the operator to adjust the length of the carrying belt 24a as needed when the pair of near vertical hydraulic cylinders 62 move the mainframe upward and downward to address the different tiers of poultry coops 14 on the transport vehicle.

Figure 7:
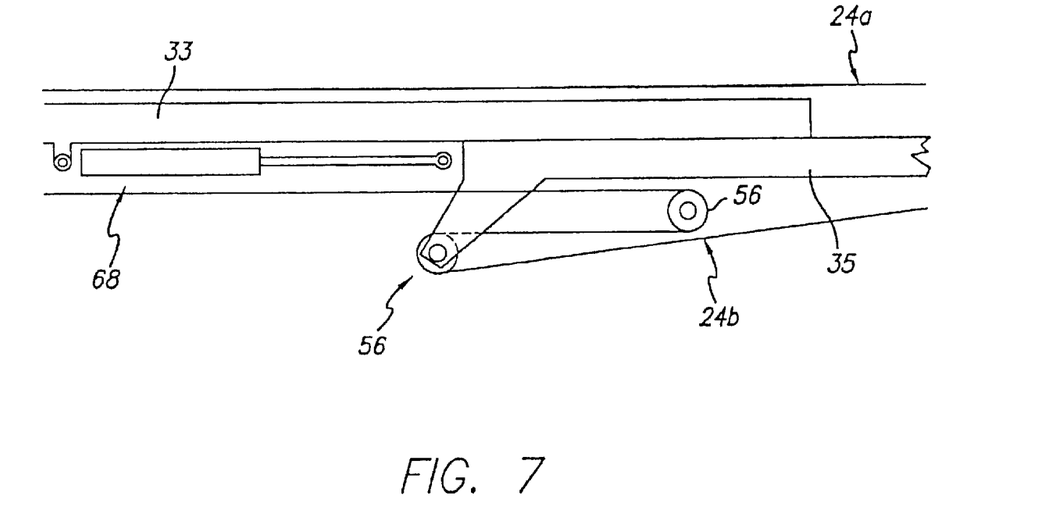
FIG. 7 is a profile view of FIG. 4 focusing on the telescoping end control hydraulic cylinders.

Similarly, as shown in FIG. 7 a pair of hydraulic cylinders 68 are positioned about the telescoping end of the apparatus relative the telescoping end belt pulleys 56. These twin cylinders allow the pulleys 56 to automatically move toward each other shortening the return belt 24b by on amount equal to the lengthening of the carrying belt 24a when the operator extends the hydraulic cylinder 68 telescoping the final telescope 35 outward. Alternately, pulleys 56 move away from each other when the operator shortens the hydraulic cylinder 68 telescoping the final telescope 35 inward.

Figure 8:
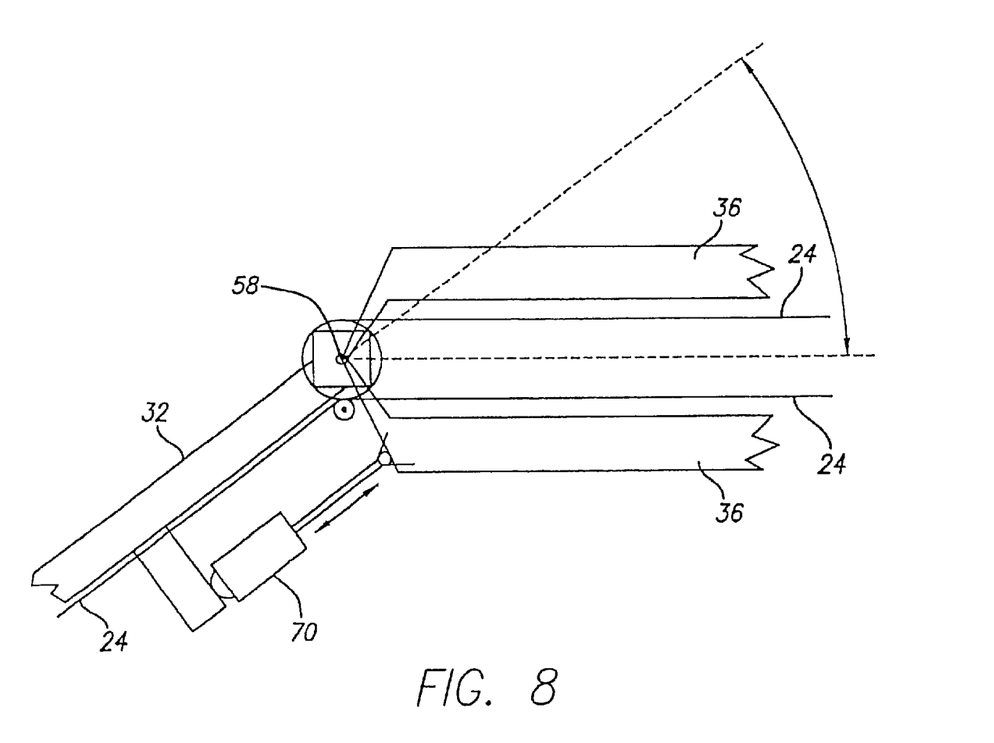
FIG. 8 is a profile view of FIG. 4 focusing on the pivoting action of telescoping end pivoting cylinders.

Additionally, FIG. 8 shows another pair of hydraulic cylinders 70 which allow the operator to pivot the telescoping portion about the telescoping pivot point 58 to ensure a level entry by the telescoping portion into the designated coop 14.

In operation, the poultry loading apparatus 10 is positioned in between the poultry confinement area and a transport vehicle loading point. The outriggers 60 are used to level the apparatus transversely and the towing vehicle is released and removed. The preloader 26 is then unfolded or telescoped at its gooseneck 28 into the horizontal position. The protective sides 34 of the mainframe 32 are unfolded and/or the removable cover 44 is attached to the apparatus. An operator then mounts the operator platform 38, and the transport vehicle 12 is positioned (as in FIG. 1).

Before loading, the operator makes certain that when the final telescope 35 is extended into a coop 14, it is parallel to and nearly touching the coop floor. This is accomplished by manipulating the controls of the hydraulic cylinders 68 and 70 upon the operators platform 38.

The poultry can now be coaxed onto the conveyor belt 24 at the preloader 26. As the designated coop 14 fills with poultry, the final telescope 35 is retracted. Belt speed as well as the telescoping speeds are controllable via the operators platform 38. When the coop is full, the belt 24 is stopped and the apparatus 10 is raised to the next level via hydraulic cylinders 64. When a row of coops are full, the transport vehicle 12 is moved perpendicularly relative to the apparatus 10 so that the next adjacent row can be loaded.

When loading is complete at a site, this embodiment includes a wash down system (not shown) which is used to clean and disinfect the apparatus before moving to another farm. The system includes a reservoir tank where water and disinfectants are mixed, and a pump and sprayer that enable the operator to adequately clean and disinfect the entire apparatus.

An alternate embodiment of the present invention will now be described with respect to FIGS. 9–16. It will be understood that while the basic belt, pulley, roller and hydraulic cylinder operations of these embodiments are quite similar, it is the overall construction, operation and control of the conveyor system which differ. In particular, this alternate embodiment comprises a conveying system of three separate belts.

Figure 9A:
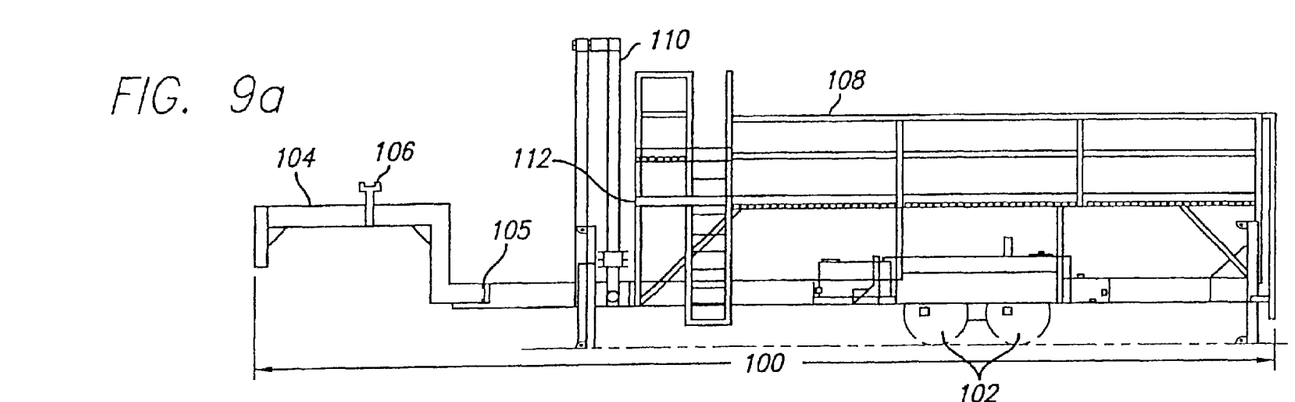
FIG. 9a is a side view of the undercarriage of the livestock loading/unloading apparatus constructed in accordance with an alternate embodiment of the present invention.

FIG. 9a illustrates the base or undercarriage 100 construction of the alternate embodiment of the mobile conveying apparatus of the present invention. This side view of the undercarriage 100 illustrates two sets of wheels 102 located near the rear end and a towing/hitch portion or gooseneck 104 located on the front end. The undercarriage 100 is legally towable as it includes all necessary towing characteristics (i.e. turn signals at and brake lights). The gooseneck 104 attaches to a truck for transport and swings on pivot pins 105 to allow clearance during loading operation of the apparatus. A head section support or saddle 106 is attached to the gooseneck 104 for the head section (148) of the apparatus to rest on during transport.

The undercarriage 100 also includes a catwalk 108 to provide an OSHA (Occupational Safety and Health Administration) approved platform to wash and disinfect the mainframe (136). Catwalk 108 may be extended to the head section of the apparatus for use in operation thereof. Additionally, the catwalk 108 serves as an ideal access to all parts of the apparatus for maintenance and repair. An elevating support or mast 110 supporting ball screws is located toward the front end of the undercarriage 100 and is primarily used to raise and lower the mainframe (136) and head section (148) via a hydraulic motor.

For further support during transport, the undercarriage includes transport bars 112 located on the catwalk 108. The purpose of the transport bars 112 is to rest the mainframe during transport so as to not damage the ball screws. This is accomplished by manually putting the bars 112 in place and lowering the ball screw nuts to a position just below the bars.

Figure 9B:
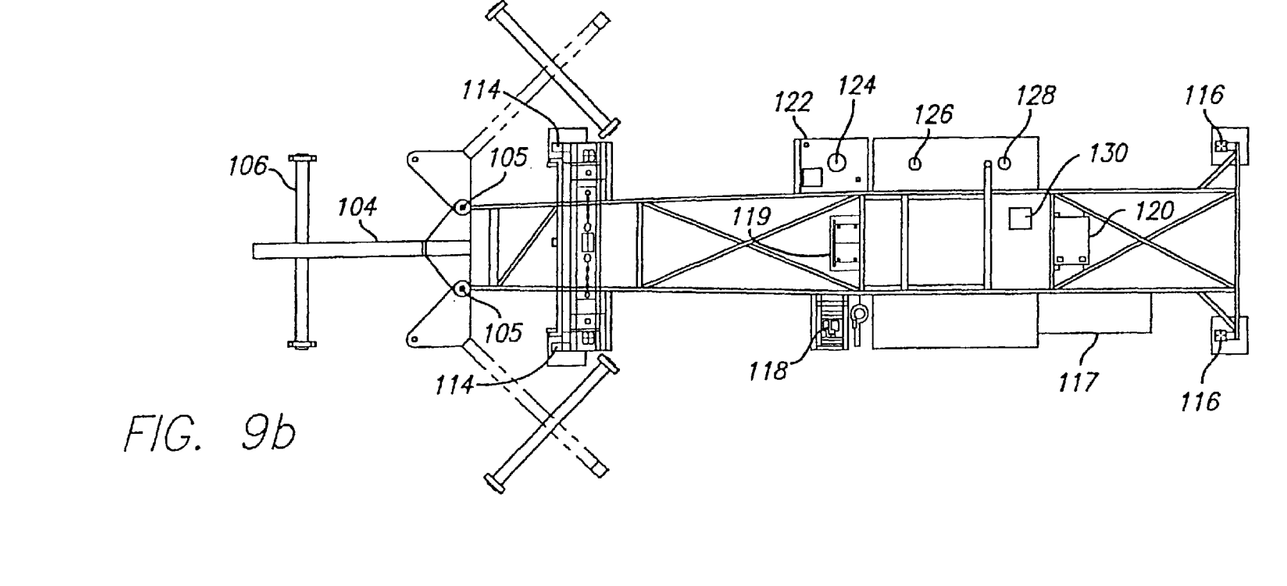

FIG. 9b illustrates the components of the apparatus which provide support and power, and in particular, those integral with the undercarriage 100. The front jacks 114 provide stability for the entire mobile conveying apparatus and adjust the height of the apparatus for start-up loading/unloading as well as for the attaching/detaching of the gooseneck 104 to a truck. Similarly, the rear jacks 116 provide stability to the undercarriage 100 and further level the apparatus according to field conditions.

The main control box 117 is located near ground level because it contains the controls to the primary functions of the system such as hydraulics and engine control; these functions being operated by batteries 119. The diesel engine 118 of the alternate embodiment powers two hydraulic pumps piped in series to provide a hydraulic system of low pressure of possibilities for a high-pressure system. The fuel tank 120 is located towards the rear of the undercarriage of 100. The hydraulic fluid is contained in a hydraulic fluid tank 122 and includes a filtering system installed on its suction and return lines. The hydraulic fluid tank 122 houses the auxiliary pump 124 which may be manually plugged into a receptacle to provide power to operate the fans (142,144) in the event of a system failure while in operation. Unless the fans are operable, the livestock would not receive oxygen and be kept cool during their trek through the apparatus.

Also located within the undercarriage 100 is the components of the dual wash system. The automated washing process of the spray/soaking bars (not shown) will be fed via wash pump 126 and provides high flow washing capabilities by low pressure/high volume. The spray/soaking bars are located in the mainframe body, are made of stainless steel material and performs the tasks of spraying, washing as well as disinfecting. The manual washing process consists of a wash wand fed via wash pump 128 and provides high pressure washing capabilities by high pressure/low volume. Water tank 130 stores the water for the entire wash system.

Figures 10A, 10B, 10C:
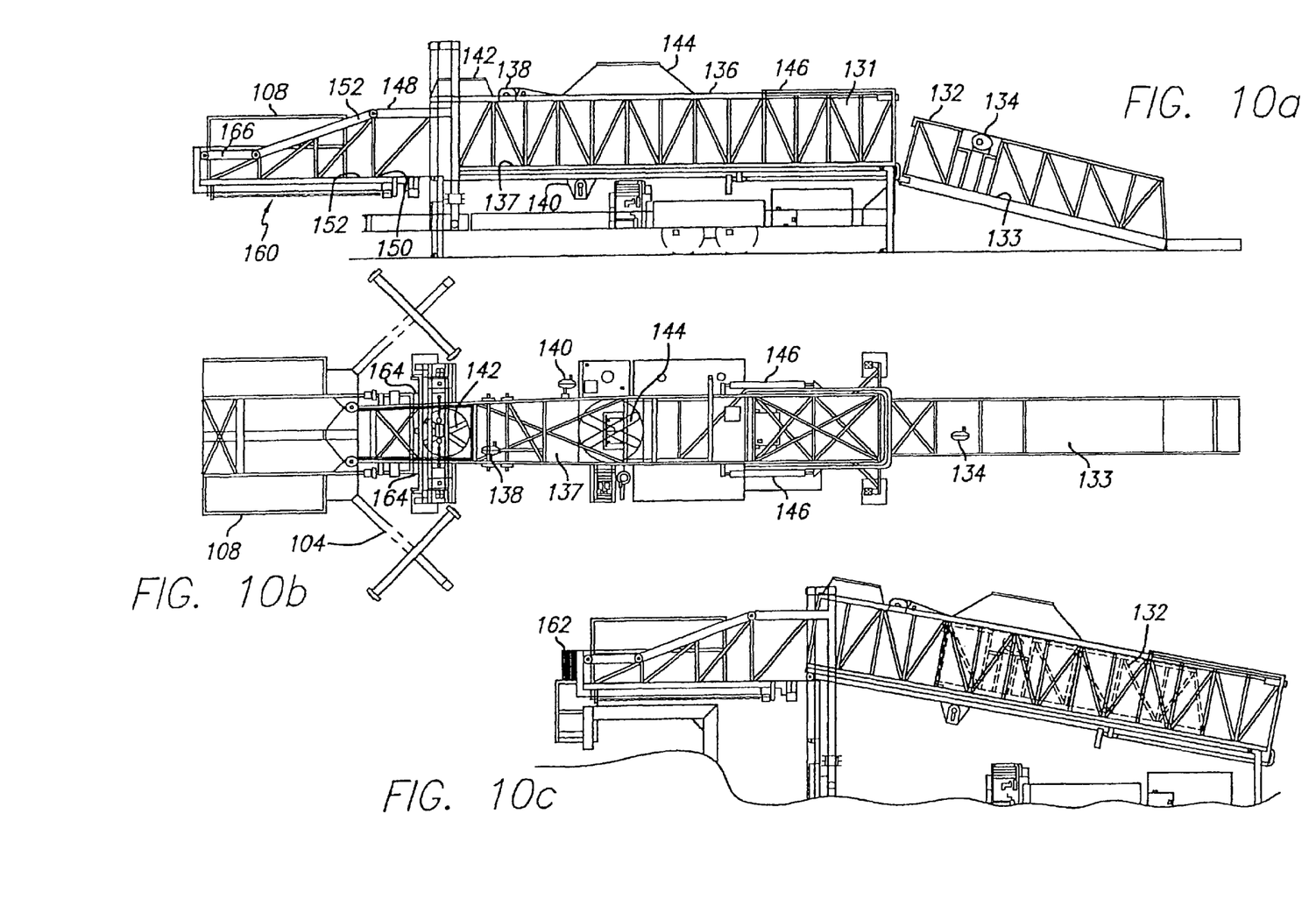

The full mobile conveying apparatus of the alternate embodiment is shown in FIGS. 10a–c. The set-up position being depicted in FIGS. 10a and 10b, while the transport position being depicted in FIG. 10c. This alternate embodiment, as the previously discussed embodiment, also presently consists of three sections supported upon the undercarriage 100 all of which may include a stainless steel shell 131. A stainless steel slider bed is located in all three sections of the apparatus. The bed provides a surface for the belts to slide on and easily kept clean and washable.

During the loading process, the livestock begin their trek on the optional preloader section 132. The preloader 132 extends from the mainframe during operation (FIG. 10a), and is located in the mainframe where it is stowed during transport (FIG. 10c—dashed lines). The preloader 132 has a separate belt 133 and hydraulic motor 134 from the mainframe allowing operation at different speeds from the mainframe and head section belts. The hydraulic motor 134 and gearbox powers the preloader belt 133 (dashed lines) which operates in tandem with the mainframe and head section belts.

During the loading process (forward direction), the hydraulic motor 134 will power the preloader belt at a speed slower than the mainframe and head section belts. While during the unloading process (reverse direction), the hydraulic motor 134 will power the preloader belt at a speed faster than the mainframe and head section belts. The mainframe and head section belts of this alternate embodiment operate simultaneously in both directions and with one controller. This dual belt control eliminates pinching of the animals at the transition point between the belts, and will further control the flow of animals to the head section (148). As the herding of livestock in the preloader 132 is sometimes uncontrollable, belt speed control is necessary to prevent damage to the animals. Also, a slow ramp-up speed is required to prevent a sudden reaction from the animal which could cause possible injury.

These belts are operable in the reverse direction to provide a work area free of animals in front of the coop, and also, in the case of unloading, to deposit animals in the production facility rather than the transport vehicle. For example, the present invention can unload livestock in case the apparatus and trailer is full by reversing the belts and conveying the livestock into the barn or the like. Additionally, in the event that too much weight has been conveyed to the trailer, the reversing of the belts will decrease such weight to the desired level.

The main body of the apparatus, mainframe 136, is located between the head section (148) and the preloader 132. The mainframe belt 137 receives livestock from the preloader belt 133 and conveys them to the head section belt and into to the coops. Preloader chain drive 138 located on top of the main frame section 136 drives two chains which push the preloader 132 out of the mainframe 136 into the operating position (FIG. 10a) and pull the preloader into the mainframe into the transport position (FIG. 10c). The drive pushes and pulls the preloader through u-channels (not shown). The mainframe belt 137 is powered by the mainframe belt and drive unit via hydraulic motor 140 located underneath mainframe 136. As the livestock is transported through the mainframe 136, they are supplied with oxygen and kept cool via fans located on the top of the mainframe. This alternate embodiment presently includes two fans. A smaller fan 142 located at the front end of the mainframe section and is designed to provide oxygen to the livestock at the head section (148). The larger fan 144 is located at the middle of the mainframe section 136 and is designed to provide maximum cooling during extreme heat in the mainframe section 136 with possibilities of assisting air flow for the smaller fan 142 at the front of the mainframe section. Hanging flexible dividers may be installed to compartmentalize airflow throughout the conveying apparatus. Both fans are controlled by the auxiliary pump 124 powered by an electric motor in emergency situations. When the engine and/or primary hydraulic system fails, the auxiliary pump 124 is activated producing oil flow and pressure to the fans. Check valves (not shown) will allow oil flow only to the fans and prevent oil flow to the entire hydraulic system. Thus, nearly insuring that fans 142, 144 remain operational during a complete failure of system oil pressure.

During operation, as the mast 110 raises the mainframe 136 and head section (148), it creates distance (190) between the coop trailer (168) and head section. A secondary index 146 is located at the back of the mainframe and corrects this lost distance by either extending or retracting the length of the mainframe as needed. This secondary index 146 is also used to extend the mainframe in response to the specific field conditions, for example, during setup the trailer may be parked a certain distance away from the loader. The secondary index will make up this distance by extending the mainframe and, thus, the head section to the transport trailer.

Figure 11:
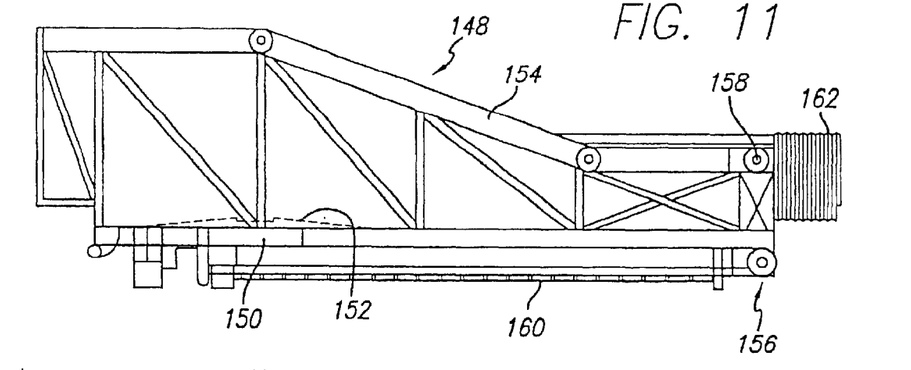
FIG. 11 is a reverse side view of the head section of the apparatus of FIG. 10.

Attached to the front of the mainframe 136 is the telescopic or head section 148 of the apparatus, see FIG. 11. A scale 150 is located in the head section 148 to record the weight and count of the livestock when the belts are moving in the forward direction and subtracts the weight and count if the belts are reversed. It may additionally be used to approximate the legal weight of the apparatus for travel. All readouts of the scale 150 may be provided to the operator control box (158). After the livestock pass over the scale, they are moved through the head section via the head section belt 152 and the top belt 154. This head section belt 152 is driven by a separate head section belt drive unit 156. The top belt 154 is located on top of the head section 148 and pushes the livestock into a squatting position for the purpose of inserting them into the coop. This top belt 154 is powered by a pulley 158 connected to the head roller which in turn presets the speed of the top belt to that of the mainframe and head section belts in both directions. This top belt may be adaptable to extend and retract in cooperation with the telescoping head section belt 152.

Located underneath the head section 148 is the primary index 160 of the apparatus. Powered by a hydraulic motor, the function of the primary index 160 is to extend and retract the belt from the coop to convey the livestock in a calm and efficient manner. This unique primary index extends the entire width of the novel coops of the present invention. Located at the end of the head section 148 is a hydraulically controlled curtain 162. As the primary index 160 is extended into the coop a gap forms between the covered head section and the covered coop. This gap needs to be covered in order to prevent livestock from escaping en route to the coop. Curtain 162 is flexible to enable it to fold into a small area to allow the apparatus operator adequate room to perform the task of opening and closing coop doors and adjusting livestock into or outside of the coop. The end of the flexible curtain 162 may include a hinged rubber flap (not shown) which the livestock push up under the coop door to prevent livestock entangling in the coop door.

Figures 12, 14, 15:
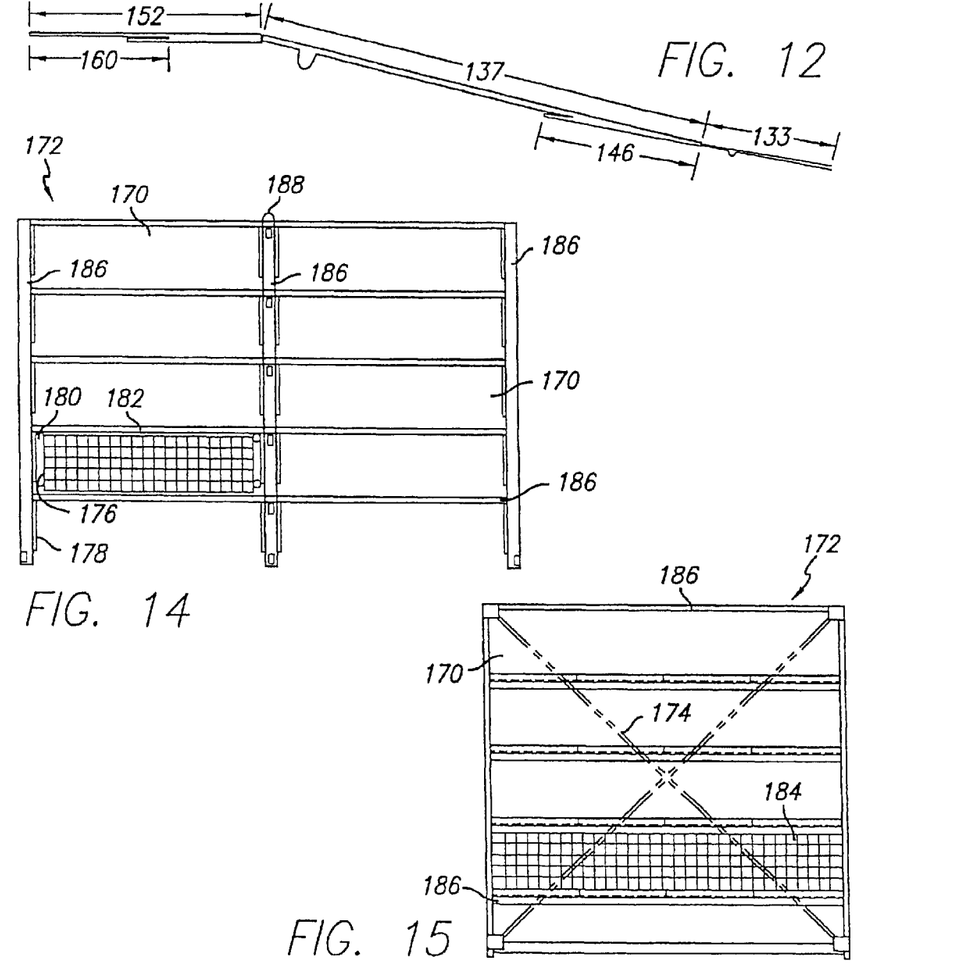

The telescoping belt configuration of this alternate embodiment is clearly shown in FIG. 12. The preloader belt 133 extends from a confinement over to the mainframe. The mainframe belt 137 extends from the preloader to the head section and includes a secondary index 146 to aid in the extension/retraction of the belt as the mainframe is adjusted to address different height coops and field position of the coop trailer. Finally, the head section belt 152 extends from the mainframe to the coop of a transport vehicle and includes a primary index 160, to aid in the extension/retraction of the belt inside and outside of the coop.

The apparatus, and in particular, the head section 148 and head section belt 152, may be more precisely leveled into the coops via the tilt mechanism 164 located on the head section connected to the mainframe. The apparatus operator adjusts the tilt according to the placement of the coop trailer. As the mainframe 136 and head section 148 raises and lowers, the automatic tilt mechanism will adjust the level of the head section for the purpose of safely extending the primary index 160 inside the coop.

The complete loading/unloading functions of the conveying apparatus may be controlled by a single operator at the operator control box 166 located on the head section catwalk. Also controllable from this box 166 are the scale, fans, tilt and jack functions. Alternatively, a tethered joystick pendant (not shown) for controlling a number of these functions may be worn by the operator using an adjustable waist belt to provide hands free operation. The tethered joystick receives operating power from the base module which in turn is connected to the batteries 119, and returns a multiplexed signal monitoring each joystick position. The tethered joystick pendant can be operated at the head section 148 for load operation or at the main control box 117 for set-up, transport and wash functions. The purpose of the tethered remote control system is to have finite control over the functions of the system, including: mast 110, secondary index 146, mainframe belt 137, head section belt 152, preloader belt 133, primary index 160 and the curtain 162. A tether cable provides the link between the base module and the joystick pendant. Additionally, an optional hand held terminal (not shown) permits remote communication with the digital controllers and becomes a cost effective alternative to laptop computers by utilizing the software and the processor of the host controller. Its menu-driven two-line display permits easy and accurate system set-up, calibration and troubleshooting.

The tethered joystick pendant and the hand held terminal work hand-in-hand to operate the system with accuracy and precision as illustrated through the following examples. 1) The mast 110 and secondary index 146 will operate from the pendant as programmed by the terminal. Each direction and speeds (minimum and maximum) of the mast 110 and secondary index are programmed separately, but will work in tandem. Thus, as the mast 110 is raised or lowered, the secondary index may be accordingly automatically adjusting the length of the mainframe 146; 2) The mainframe, head section and preloader belts will operate simultaneously from the pendant with the terminal providing complete control (ramp-up and maximum speeds) of both directions of the belts; and 3) The primary index 160 and the curtain 162 will operate from the pendant and cooperate through the terminal. The primary index will require a rapid extension speed and a slower retraction speed because of the conveyance of the livestock. The curtain may be programmed accordingly via the terminal to insure correct operation with the primary index.

This alternate embodiment of the present invention includes a number of inherent safety measures including limit switches and velocity fuses. Limit switches are present on the mast 110 and the primary index 160 to set the maximum and minimum travel of ball screws. Further limit switches at the end of the primary index 160 detect the pressure on the coop floor to protect it from excessive weight from the primary index 160 as well as collisions of the index into the trailer or coop frame. Limit switches on the preloader chain drive and the secondary index also prevent damage and aid to the overall safety of the apparatus. The velocity fuses are an added feature in case system oil pressure fails.

Figures 13A, 13B:
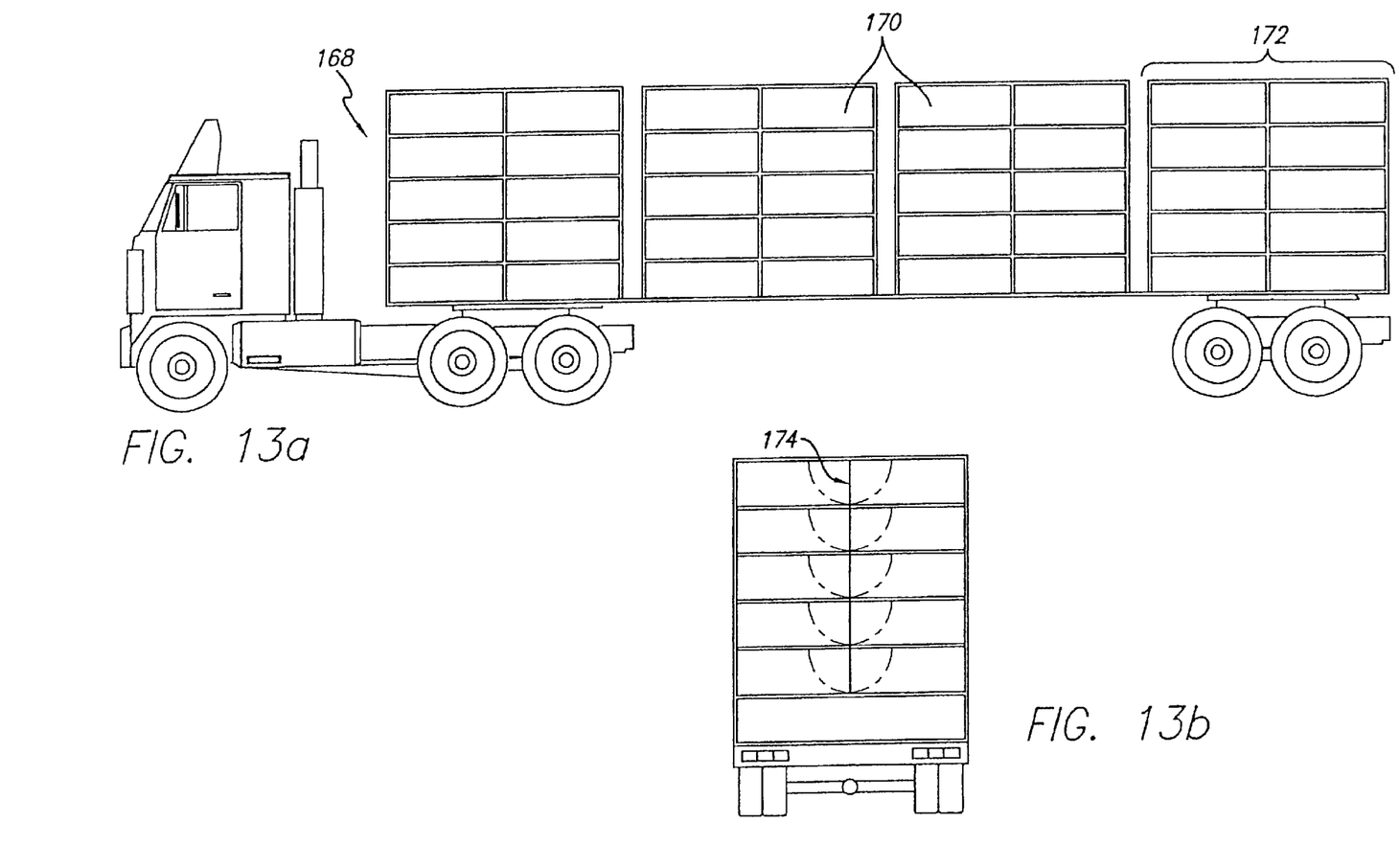

FIGS. 13a and 13b show views of a transport vehicle or coop trailer 168 constructed in accordance with the principles of the alternate embodiment of the present invention. FIG. 13a depicts a side view of the trailer 168 showing how the transport units or coops 170, sometimes referred to as "racks" in the art, are arranged on the bed of the truck. In this particular embodiment, there are 10 coops 170 per coop module 172. FIG. 13b shows an optional swinging partition 174 of the coops which may swing in either direction, depending upon the set-up of the loading/unloading procedure. A standard coop trailer typically includes one hundred forty four coops per trailer, with each coop having a volume of about 16 cubit feet. This standard trailer requires the loading of one side of the trailer and turning the trailer around to load the opposite side.

By contrast, the present system includes a coop trailer 168 with coops 170 having a volume of about 64 cubit feet. The swinging partition 174 of this trailer 168 allows the extension of the primary index 160 through the whole width of the coop, thus allowing the trailer to be completely loaded from one side. With fewer and larger coops, the loading/unloading, and cleaning is easier and requires less time.

More particularly, the preferred embodiment of the coop module 172 design of the present invention is illustrated in FIGS. 14–15. FIG. 14 shows an enlarged side view of the coop module 172 of the coop trailer 168. This particular module 172 has ten (10) openings on each side for ten coops 170. However, to reduce construction costs, modules may be built together. Thus, modules could have 20 coops instead of 10, with the possibility of one module per trailer. The coops 170 have openings on either side to enable the head section 148 of the apparatus to extend from either side of the trailer 168 depending upon field conditions and operator's preference. This module 172 is currently 11 feet 4.75 inches wide, but may obviously vary depending upon the length of the trailer 178. Each module 172 is preferably braced for stability with crossed from members in the form of an "X" 174 as shown in FIG. 15.

The coop floor support, not shown, is currently a checker pattern flat iron bar structure, while the coop floor is a thin durable and washable plastic compound. The floor is slid into place from the side and held in place by metal tabs. The floor may be more securely held atop the structure via screws in its middle, or rubber mounts attached above to allow the floor to flex a minimal band, particularly during the updraft wind pressure caused during transport without the livestock.

The coop door 176 is constructed of thin steel barbs in a checker pattern to both give it strength and allow the flexibility to bend while maintaining shape. A runner guide 178 or the like is positioned on both sides of the door currently consisting of a thin rod to slide the door 176 opened and closed through the door's ringlets 180 or the like. To prevent any possible damage from the extension of the head section, this guide is positioned roughly four inches off the floor. A hook 182 or the like locks the door 176 in the open position to prevent it from sliding down during loading/unloading and to prevent the animals from ensnaring themselves.

An additional mesh 184 is used for the sides of the coop. This mesh 184 is stationary and welded to the tubular steel frame 186 of the module. The size of the mesh is such that it allows for free air movement yet small enough where animal body parts cannot become entangled during transport and/or loading/unloading. This mesh may be enclosed by either wooden panels or a flexible curtain (not shown) during cold weather.

The coop module 172 of the present invention includes an attachment 188 in the middle support column. This attachment 188 enables the module to be lifted or placed on the flatbed trailer by a proper hoisting apparatus. The module is then attached to the trailer in a semi-secure manner to allow the module to move slightly during transport. This movement helps to deter stress cracks on the frame. The dimensions illustrated by FIGS. 14–15 are for the current coop module to be used with the loading/unloading apparatus. Those dimensions are freely variable depending upon any particular conditions.

In operation, the mobile conveying apparatus of the alternate embodiment is legally towed to its operational destination while in its transport position as shown in FIG. 10c. In particular, the transport position includes the complete retraction of the primary index 160 into the head section 148 and the storage of the preloader 132 inside the mainframe 136. Upon reaching its destination, the apparatus is positioned between the barn and coop trailer (for example) making certain sufficient vertical clearance is available between maximum height of the loader and header of door. The front and rear jacks (114,116) are then used to level the apparatus transversely and the transport vehicle is disconnected. The mast 110 is raised to a proper height to allow the swing away gooseneck 104 to move to the appropriate side safely away from the operating activity. The transport bars 112 are slid into proper position, the mast 110 is then lowered to its lowest position and the jacks once again level the apparatus. The position of the mainframe 136 by way of mast 110 control is critical so no damage occurs during the extension of the preloader 132 so that the mast 110 is then raised to the designated position for the extension of the preloader 132.

The preloader 132 and mainframe 136 must be in alignment to allow the preloader 132 to eject freely from within the mainframe 136. An adjustable switch or optical eye or pressure relief valve is required to align the mainframe to the preloader. This mechanism will regulate chain drive 138 operation to prevent an operator from damaging the apparatus. The chain drive 138 may now be actuated to extend the preloader to drop in the u-channel on the mainframe for the correct position between the mainframe belt 137 and the preloader belt 133.

Once the conveying apparatus is in proper position, the coop trailer 168 is positioned for the loading/unloading operation. When the trailer is in place, some minor adjustments are completed prior to operation to ensure the smooth transport of livestock. The mast 110 is raised and lowered from minimum to maximum height with intermittent stops in order to check the distance between mainframe and the header of doorway. During this raising and lowering of the mast, the secondary index is adjusted accordingly to the position of the coop trailer. The primary index is inserted into a coop and proper adjustments are made. Finally, head section, mainframe and preloader belts are engaged, the scale is programmed and set, and the fans are engaged according to field conditions.

Figure 16A:
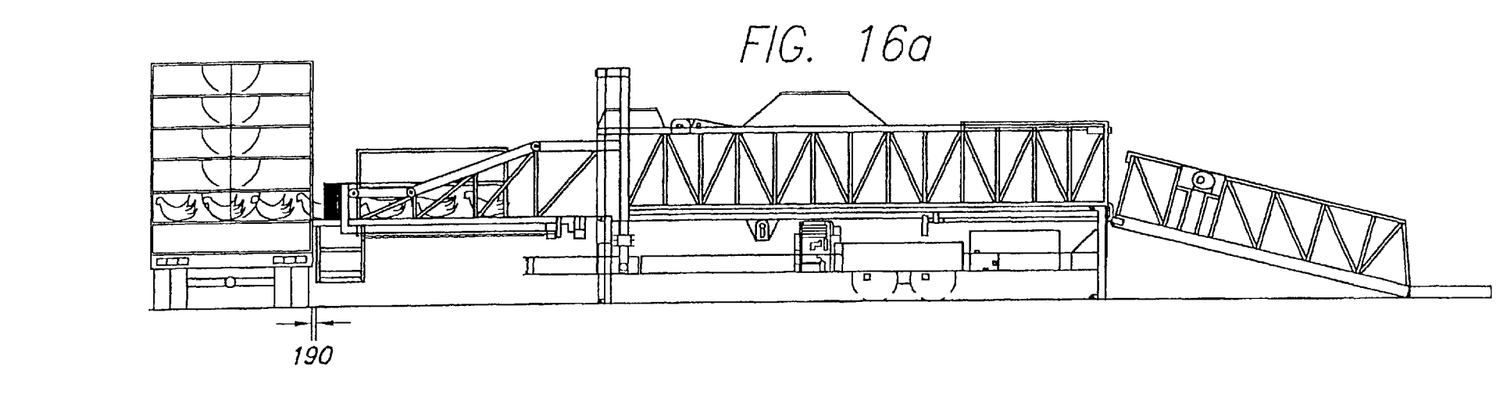
FIG. 16a is a side view of the livestock loading/unloading system constructed in accordance with the principles of the present invention focusing on functional aspects as livestock is loaded into a lower coop of the transport vehicle.

Now the operator is ready to begin the loading/unloading process. In FIG. 16a, the operator has raised the mast to the position to address the bottom level coop. Primary index is extended all the way to the opposite end of the coop and the curtain is extended to the entrance of the coop. As the livestock, poultry in this case, are conveyed to the opposite end of the coop, the primary index is retracted and the coop is filled with poultry. The belts are now slowed and perhaps stopped, the curtain and primary index is completely retracted. The belts may even be reversed to convey the animals away from the area in front of the coop.

Figure 16B:
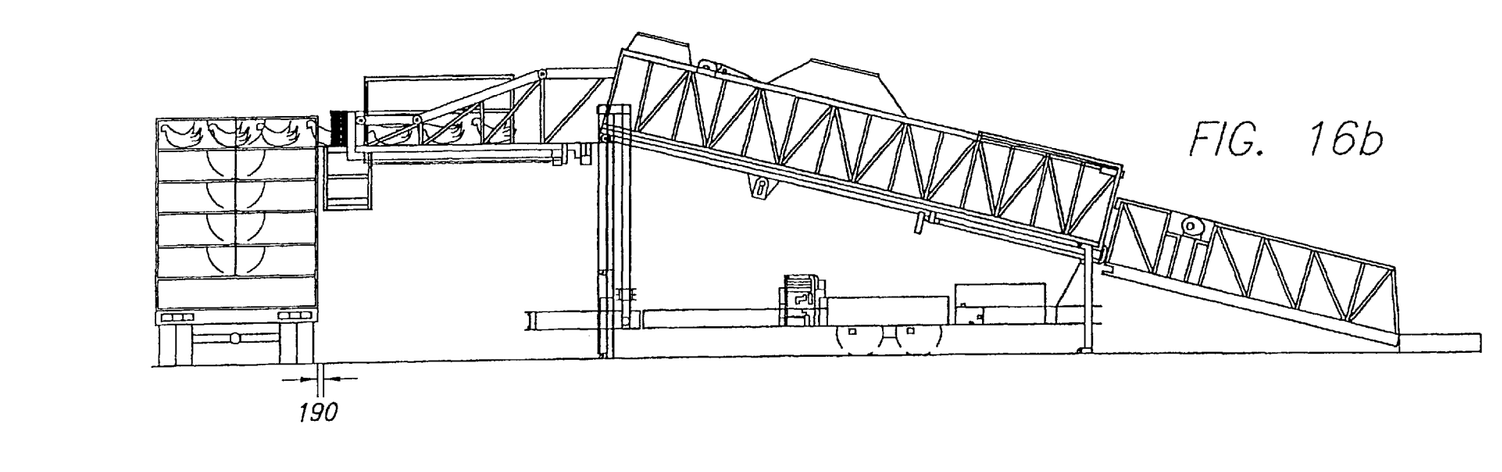
FIG. 16b is a side view of the livestock loading/unloading system constructed in accordance with the principles of the present invention focusing on functional aspects as livestock is loaded into the top coop of the transport vehicle.

Addressing a higher level coop is illustrated in FIG. 16b. The mast 110 is raised from its position in FIG. 16a to its position in FIG. 16b. In order to keep the distance 190 constant between the head section 148 and the coop trailer 168, the secondary index is extended/retracted as the mast is raised/lowered. Thus, from FIG. 16a to FIG. 16b, the mast is raised and the secondary index is extended to keep this distance 190 constant. Now the primary index and curtain can be extended into the higher level coop to fill with animals. Again, note that the primary index of the present invention is capable of extending the head section conveyor the entire width of the coop trailer thus allowing the loading/unloading to be accomplished from one side of the trailer. When the acceptable weight is achieved, or all of the coops are full, the mast is lowered and the fans are disengaged.

The wash operation is accomplished by extended the curtain and both the primary and secondary indexes and raising the mast. The soaking bars are turned on in the mainframe and operate for a predetermined time period. The mainframe belt is washed with the spray bars while the preloader belt and all other components of the apparatus are washed with the hand wand. The pressure and volume of all washing operations have variable adjustments.

After washing is completed, the curtain and indexes are retracted, the preloader belt drive unit is disconnected and the preloader chain drive is connected to the preloader. The preloader chain drive can now be engaged to retract the entire preloader inside the mainframe. The mast is raised to swing the gooseneck to its proper position and locked in place by dropping a pin. Transport bars are slid into place for the mainframe to rest on. The operator then lowers the mast to rest the head section into the saddles attached to the gooseneck. By lowering the mainframe onto the transport bars and continuing to lower the mast, the transport bars will hold the weight of the mainframe to eliminate any possible damage to the ball screws. The apparatus is now in the transport position as shown in FIG. 10c. The transport vehicle is backed up to the gooseneck, the front jacks raise the gooseneck to allow the truck to be connected to a hitch, and all four jacks on the undercarriage are raised, and the apparatus can be towed to its next destination.

Yet another alternate embodiment of the present invention, not shown, includes a two (2) conveyor apparatus. In this embodiment, the head section and the mainframe section have a single belt, while the preloader has its own separate belt. It will be appreciated that operation and control of this embodiment shall be as previously discussed above.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A livestock loading/unloading system for loading/unloading livestock from a transport vehicle, the vehicle having two sides and a width extending from one side to the other, the system comprising:

a storage unit for the storage of livestock during transport, said unit supported by the vehicle and being generally rectangular with a top, a bottom, two sides and two open ends, said sides generally extending said width of said vehicle and each of said ends including a door;

a base having a first and a second end;

a conveying mainframe having a first and a second end, said first end of said mainframe pivotably attached near said first end of said base;

a telescopic conveying belt section having a conveyor belt and further having a first end and a second end, said first end of said telescopic conveying belt section pivotably attached to said second end of said mainframe, said second end of said telescopic conveying belt section generally capable of extending and retracting said belt from one end of said unit to the other; and an elevating support member having one end attached near said second end of said base and another end attached near said second end of said mainframe whereby said elevating support member is capable of raising/lowering said mainframe.

2. A livestock loading/unloading system as defined in claim 1 further having a conveying preloader section having a first end and a second end, said second end of said preloader pivotably attached near said first end of said mainframe.

3. A livestock loading/unloading system as defined in claim 2 wherein said preloader is capable of being stored within said mainframe.

4. A livestock loading/unloading system as defined in claim 1 further having a top conveyor driven in conjunction with said conveying telescopic section whereby livestock is conveyed therebetween and into said unit.

5. A livestock loading/unloading system as defined in claim 1 wherein said base further includes a gooseneck for the attachment of said base to a trailer, said gooseneck being capable of swinging to either side of said base.

6. A livestock loading/unloading system as defined in claim 1 wherein said mainframe further includes sidewalls and a cover for enclosing at least a portion thereof.

7. A livestock loading/unloading system as defined in claim 6 further including a fan.

8. A livestock loading/unloading system as defined in claim 1 wherein said base includes at least two jacks to aid in the leveling of the system.

9. A livestock loading/unloading system as defined in claim 1 further including a dual wash system comprising manual and automatic wash components.

10. A livestock loading/unloading system as defined in claim 1 wherein said conveying and elevating functions are remotely controlled.

11. A livestock loading/unloading system for loading/unloading livestock from a transport vehicle, the vehicle having two sides and a width extending from one side to the other, the system comprising:

a storage unit for the storage of livestock during transport, said unit supported by the vehicle and being generally rectangular with a top, a bottom, two sides and two open ends, said sides generally extending said width of said vehicle and each of said ends including a door;

a base having a first and a second end;

a main belt conveying means operatively connected to said base and having a receiving end and a delivering end;

a telescopic belt conveying means operatively connected to said main belt conveying means, said telescopic belt conveying means including a means for extending/retracting a telescopic belt from one end of said unit to the other; and a means for raising/lowering said main belt and telescopic belt conveying means in the vertical plane relative to said base.

12. A livestock loading/unloading system as defined in claim 11 wherein said means for raising/lowering include ball screw mechanisms.

13. A livestock loading/unloading system as defined in claim 11 further including a preloader belt conveying means operatively connected to said main belt conveying means.

14. A livestock loading/unloading system as defined in claim 13 wherein said preloader belt conveying means is storable within said main belt conveying means.

15. A livestock loading/unloading system as defined in claim 13 wherein said base further includes a gooseneck for the attachment of said base to a trailer, said gooseneck being capable of swinging to either side of said base.

16. A livestock loading/unloading system as defined in claim 13 further having a top conveyor driven in conjunction with said conveying telescopic section whereby livestock is conveyed therebetween and into said unit.

17. A livestock loading/unloading system as defined in claim 13 wherein said base includes at least two jacks to aid in the leveling of the system.

18. A livestock loading/unloading system as defined in claim 13 further including a fan.

19. A livestock loading/unloading system as defined in claim 13 further including a dual wash system comprising manual and automatic wash components.

* * * * *